March 10, 1959

E. TOMKOW 2,876,553

AIR GAGE HEAD

Filed Nov. 7, 1956

INVENTOR.
EDWARD TOMKOW
BY
SMITH, OLSEN, LEWIS & McRAE
ATTORNEYS

2,876,553

AIR GAGE HEAD

Edward Tomkow, Dearborn, Mich., assignor to Dearborn Gage Company, Dearborn, Mich., a corporation of Michigan Application November 7, 1956, Serial No. 620,904

12 Claims. (Cl. 33—169)

This invention relates to a fluid-actuated gage head for accurately measuring dimensions and surface characteristics of parts, including for example such characteristics as surface flatness, eccentricity of bores, and height of a part surface above a surface plate.

Objects of the invention are, singly and collectively, to provide a fluid-actuated gage head wherein:

(1) The stylus or work-engaging element of the head is adjustable relative to the head in such manner that it may be directed into crevices, slots and other small clearance spaces in the work without adjustment or recalibration of the float mechanism used to record stylus deflection.

(2) The stylus may be operatively utilized against both under surfaces and upper surfaces of the work without recalibration of the float mechanism.

(3) The gage head may be constructed as a relatively low cost item.

Other objects of this invention will appear in the following description and appended claims, reference being had to the accompanying drawings forming a part of this specification wherein like reference characters designate corresponding parts in the several views.

In the drawings:

Fig. 1 is a sectional view of one embodiment of the invention taken on line 1—1 in Fig. 2.

Fig. 2 is a sectional view on line 2—2 in Fig. 1.

Fig. 3 is an elevational view of a stylus member employed in the Fig. 1 embodiment, taken in the direction of arrow 3 in Fig. 2.

Fig. 4 is a sectional view on line 4—4 in Fig. 1.

Fig. 5 is a diagrammatic view of a measuring system employing the Fig. 1 gage head.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a head 10 of the fluid-actuated gage system shown in Fig. 5. Said head is of generally rectangular cross section, and is provided with a through bore 12 of circular cross section. A plug 14 is fixedly positioned in an intermediate portion of bore 12 so as to form an inlet conduit 16 and an outlet passage 18. A tubular fitting 20 is fixedly positioned in the upstream end of conduit 16. Fitting 20 is provided with a reduced portion 22 which receives one end of a plastic tube 24. The other end of tube 24 is intended to connect with a float mechanism of the type shown in U. S. Patent No. 2,593,957. In this regard tube 24 corresponds in function with tube 17 in Patent No. 2,593,957.

Head 10 is provided with two circular aligned bores 26 and 28, each of which includes an outer bore portion 30 and an inner bore portion 32 of smaller diameter than the outer bore portion. The outer bore portions form inlet chambers, and the inner bore portions form metering orifices for the chambers. Metering elements in the form of balls 34 and 36 are positioned in the chambers. The inlet chambers communicate with conduit 16 through straight bores 38, which are of circular cross section. Plugs 40 and 42 are fixedly positioned in counterbores 44 at the outer limits of bores 26 and 28. The design and position of the bores 12, 26 and 28 is such that bores 38 can be drilled into head 10 after formation of counterbores 44. Balls 34 and 36 are inserted in the inlet chambers before insertion of plugs 40 and 42.

The downstream end of head 10 is slotted to provide interior surfaces 46, 48 and 50. A stylus 52 extends between surfaces 46 and 50, and into passage 18. Stylus 52 is formed of two interlocked elements 54 and 56. Element 54 is provided with two cylindrical projections 58 and 60, and a cylindrical bore 62. A pin 64 extends through bore 62 into press-fit relation with the surfaces defined by aligned openings 66 in head 10. The fit of bore 62 on pin 64 is a sliding fit, whereby to allow for pivotal movement of element 54 around the pin.

Stylus element 56 includes a thin arm 68 which is bifurcated at 70 to form two fingers 72 and 74. The opposed surfaces of fingers 72 and 74 are of arcuate configuration so as to frictionally grip projection 58. This frictional grip is strong enough to prevent relative movement between elements 54 and 56 when tip 76 presses against a work piece. However, elements 54 and 56 may be moved relative to one another around the axis of pin 64 by manual pressure on element 54. Element 54 may be adjusted to any rotated position, as for example, the dotted line position shown in Fig. 3.

The upstream end of element 56 has extended therefrom two arms 78 and 80 which register with ports 32. The arms are preferably formed by a pin 82, which is of slightly less length than the diameter of passage 18, whereby to permit installation of the pin on element 56 prior to insertion of stylus 52 into passage 18.

The lower corner portions of head 10 are cut away at 84 and 86 to form a slide 88. Slide 88 accommodates head 10 for mounting in a gage head mount of the type shown in U. S. Patent No. 2,267,583.

Head 10 may be incorporated in a measuring system in the manner shown in Fig. 5. As there shown, head 10 is mounted for pivotal adjustment on a mount 90, which in turn is mounted for vertical adjustment on a standard 92. One end of tube 24 is connected to a float mechanism 94 of the type shown in U. S. Patent No. 2,593,957. Standard 92 and the workpiece 96 are positioned on a surface plate 98.

In operation, when pressure fluid is delivered through mechanism 94 and then through tube 24 (from a remote source, not shown) there is an upward movement of float 100 to an extent determined by the amount of fluid passing outwardly through passage 18. The more fluid that passes through passage 18, the higher will be the position of float 100.

The amount of fluid flowing through passage 18 will be determined by the position of stylus 52. When stylus 52 is fully deflected by the upper surface of work piece 96 arm 80 is moved through lowermost port 32 so as to push ball 36 a maximum distance away from the port. As a result fluid from tube 24 is enabled to flow through conduit 16 into chamber 30, through lowermost port 32, and out through passage 18. The pressure of the fluid in conduit 12 maintains ball 36 against pin 80 and ball 34 against its port 32. The extent to which stylus 52 is deflected by the surface of workpiece 96 will determine the distance by which ball 36 is moved away from its port 32 and consequently the amount of fluid flowing out through passage 18. The extent of "stylus deflection" is of course dependent on the vertical dimension of work piece 96, and the position of float 100 is determined by the extent of stylus deflection. Hence, a visual examination of the position of float 100 serves to indicate the vertical dimension of work piece 96.

In use of the Fig. 5 mechanism standard size work pieces having desired plus and minus tolerance dimensions are positioned on surface plate 98 in place of work piece 96. The two positions of float 100 when the standard size pieces are employed are noted from the scale adjacent the float. In this way the float positions are correlated with the desired plus and minus tolerances. Suitable flow-adjusting devices are employed on mechanism 94 for insuring movement of the float over a substantial portion of the scale when operating with work pieces having the desired tolerance dimensions.

Stylus 52 is capable of movement toward ball 34 as well as ball 36. Hence stylus 52 can conveniently be employed on under surfaces of work pieces as well as upper surfaces thereof without adjustment or recalibration of mechanism 94. In this connection it will be noted that movement of stylus 52 to effect float movement within the desired tolerance range is independent of the position or inclination of head 10. Therefore, once tolerance positions for float 100 have been established head 10 may be pivoted around mount 90, and mount 90 may be adjusted vertically on standard 92 without destroying calibration of mechanism 94. As a result head 10 can be manipulated around projecting portions of irregularly contoured work pieces without destroying the calibration of float mechanism 94. Element 54 can be employed in any position that the character of the work piece dictates.

I claim:

1. A fluid-actuated gage comprising a head; a bore extending through said head; a plug in an intermediate portion of said bore; a second bore in said head at right angles to said first bore; said second bore intersecting said first bore at a point downstream from the plug; said second bore being of smaller cross section than the outermost portion whereby to define an orifice at the juncture between said portions; a metering element in the outermost portion of the second bore; a second plug at the outermost limit of the second bore; a passage interconnecting the upstream portion of the first bore and the outermost portion of the second bore; a stylus extending through the downstream portion of the first bore; means mounting said stylus for pivotal movement; said stylus including an arm in registry with the innermost portion of the second bore; whereby during pivotal movement of the stylus the arm strikes the metering element so as to move said element away from the orifice.

2. The combination of claim 1 wherein the stylus is comprised of two separate elements interlocked together at the stylus pivot point for adjusting movements relative to one another around the pivot axis.

3. The combination of claim 2 wherein one of the stylus elements is provided with a cylindrical projection and the other stylus element is provided with a bifurcated arm, the opposed surfaces of which are contoured to frictionally clamp the cylindrical projection; there being a cylindrical bore through said projection, and a pin extending through the head and cylindrical bore to provide the pivotal mounting for the stylus.

4. The combination of claim 1 wherein the metering element takes the form of a ball.

5. The combination of claim 1 wherein the stylus is comprised of two separate elements; one of said stylus elements being provided with two aligned cylindrical projections; the other stylus element being provided with a bifurcated arm, the opposed surfaces of which are contoured to frictionally clamp one of the cylindrical projections; there being a cylindrical bore through said projections; and a pin extending through the head and cylindrical bore to provide the pivotal mounting for the stylus; the cylindrical projections preventing the stylus elements from frictionally engaging surfaces of the head.

6. A fluid-actuated gage comprising a head; an inlet conduit therein; two opposed inlet chambers in said head in communication with said inlet conduit; an outlet passage in said head extending into the space between said opposed chambers; orifices between the inlet chambers and outlet passage; a metering element in each of said chambers; and a stylus pivotally mounted on said head; said stylus extending through the outlet passage and having arm portions thereof in registry with the orifices; whereby pivotal movement of the stylus causes alternate ones of the arm portions to move the adjacent metering element away from its orifice.

7. The combination of claim 6 wherein the spacing between the free ends of the arm portions is less than the diameter of the outlet passage.

8. The combination of claim 6 wherein the downstream ends of the head faces parallel to the stylus pivot axis converge toward one another; and the stylus pivot is located adjacent the juncture between said faces.

9. The combination of claim 8 wherein the downstream end of the head is slotted at right angles to the stylus pivot axis, whereby to provide a clearance space for accommodating the stylus pivot.

10. A gage comprising a head; two aligned bores extending inwardly from opposed faces of the head; the innermost portions of the bores being of smaller cross section than the outermost portions whereby to define orifices at the junctures between said portions; a third bore extending lengthwise through said head and having a plug between its ends to form on one side of the plug an inlet passage and on the other side an outlet passage at right angles to said aligned bores; said outlet passage extending into the space between said bores in communication with the innermost bore portions; metering elements in the outermost bore portions; a stylus extending through said outlet passage; means mounting said stylus for pivotal movement; said stylus having arm portions thereof in registry with the orifices; whereby pivotal movement of the stylus causes alternate ones of the arm portions to move the adjacent metering element away from its orifice.

11. The combination of claim 11 wherein there are two straight bores extending from the outer limits of the aligned bores to the upstream portion of the through bore, and plugs at the outermost limits of the aligned bores; the upstream portion of the through bore constituting an inlet passage.

12. A gage comprising a head having two opposed inlet chambers therein; a single inlet passage in direct communication with both said chambers for supplying fluid under pressure thereto; an outlet passage in said head extending into the space between said opposed chambers; an orifice between each inlet chamber and said outlet passage; a metering element for each of said orifices positioned on the upstream sides thereof; and a stylus movably mounted on said head; said stylus extending through said outlet passage and being mounted for operatively engaging either of said metering elements, whereby to selectively open one orifice while keeping the other orifice closed and open said other orifice while keeping said one orifice closed.

References Cited in the file of this patent

UNITED STATES PATENTS

| 1,144,367 | Lowe | June 29, 1915 |
| 1,436,111 | Reich | Nov. 21, 1922 |
| 2,098,914 | Gorrie | NOV. 9, 1937 |
| 2,264,254 | Brandt | Nov. 5, 1941 |

FOREIGN PATENTS

| 647,009 | Great Britain | Dec. 6, 1950 |